UNITED STATES PATENT OFFICE 2,233,419

ALIPHATIC AMINE SALTS OF NICOTINIC ACID

Edmond E. Moore, Waukegan, Ill., assignor to Abbott Laboratories, North Chicago, Ill., a corporation of Illinois No Drawing. Application January 20, 1938, Serial No. 185,910

7 Claims. (Cl. 260—295)

The present invention relates to novel compounds having valuable therapeutic properties and more in particular to stable aliphatic amine salts of nicotinic acid possessing characteristics making them particularly adaptable for hypodermical administration.

It is known that nicotinic acid and its hydrochloride have valuable physiological properties. However, solutions of these compounds are unsuited for parenteral administration and their use has been restricted for the most part to oral administration. Nicotinic acid for example is relatively insoluble in water and its aqueous solutions having a pH value of approximately 3.6 are too acid to be satisfactory for injection purposes. Observations obtained from control experiments made with a one percent solution of nicotinic acid, which represents a practically saturated solution, show the solution of the acid to be irritating to the tissues and to be only slowly absorbed. Nicotinic acid hydrochloride on the other hand is soluble in water but its solution is very acid. For example, a ten percent solution of nicotinic acid hydrochloride has a pH value of about 1.2, which makes this form of the acid unfit for parenteral injection. The alkali metal salts of nicotinic acid are also soluble in water but the resulting solutions are too alkaline for hypodermical administration.

The principal object of my invention is to provide soluble salts of nicotinic acid which form aqueous solutions adaptable for parenteral injection.

Other objects of my invention will be apparent as the description proceeds hereinafter.

I have discovered that the straight chain (non-cyclic) aliphatic amine salts of nicotinic acid and especially the alkanol amine salts of nicotinic acid are soluble in water and the resulting solutions practically neutral. I have also discovered that the solutions of the aliphatic amine salts containing, for example, the equivalent of 5 percent of nicotinic acid are compatible with the tissues, are non-irritating when injected, and are quickly and completely absorbed. The salts of nicotinic acid of my invention have physiological properties similar to one of the constituents of the vitamin B complex and are particularly adaptable for use in vitamin therapy.

The compounds included in my invention may be prepared by dissolving equivalent weights of nicotinic acid and an aliphatic amine in a suitable solvent and then removing the solvent. An alternative method suitable for preparing the aliphatic amine salts is to dissolve the reactants in a suitable solvent and then add a second solvent which will precipitate the salt. It will be understood by those skilled in the art that it is not necessary to isolate the salt in solid form when preparing solutions for parenteral injection.

The following examples will serve to illustrate my invention.

EXAMPLE I

Methyl glucamine nicotinate

An aqueous solution containing methyl glucamine nicotinate in a concentration equivalent to 5 grams of nicotinic acid per 100 cc. of solution may be prepared as follows:

About 5.0 grams of nicotinic acid is mixed with about 7.93 grams of methyl glucamine and water added to a volume of about 100 cc. The solution is filtered and may then be filled into ampoules which can be sterilized with heat in the usual manner. The solution prepared as above is non-irritating to the tissues and is suitable for hypodermical administration.

EXAMPLE II

Monoethanolamine nicotinate

About 6.1 grams (0.1 mol.) of monethanolamine and about 12.3 grams (0.1 mol.) of nicotinic acid are dissolved in hot absolute alcohol. The alcohol is then removed under diminished pressure in the usual manner. The monoethanolamine salt of nicotinic acid is obtained as an oily liquid which is soluble in water in all proportions and is stable. The aqueous solutions of this salt are also compatible with the tissues and are suitable for injection purposes.

EXAMPLE III

Isobutanolamine nicotinate

About 8.9 grams (0.1 mol.) of isobutanolamine and about 12.3 grams (0.1 mol.) of nicotinic acid are dissolved in hot absolute alcohol. The solution is cooled and dry ether is then added. The salt is thrown out upon the addition of the ether as a finely divided amorphous precipitate which may be recrystallized from absolute alcohol. The isobutanolamine salt of nicotinic acid is a white solid extremely soluble in water and the solutions of the salt which are practically neutral are adaptable for parenteral injection.

Using similar methods, the following aliphatic amine salts of nicotinic acid may be prepared:

Monoethanolamine nicotinate. CH₂OHCH₂NH₂C₅H₄NCOOH

Isopropanol amine nicotinate.
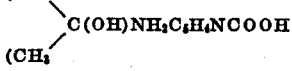
(CH₃)₂C(OH)NH₂C₅H₄NCOOH

Isobutanolamine nicotinate. (CH₃)₂C(OH)CH₂NH₂C₅H₄NCOOH
Glycerylamine nicotinate. CH₂OH.CHOHCH₂NH₂C₅H₄NCOOH
Glucamine nicotinate. CH₂OH(CHOH)₄CH₂NH₂C₅H₄NCOOH
Diethylamino propanol nicotinate. CH₂OHCH₂CH₂N(C₂H₅)₂C₅H₄NCOOH
Triethanolamine nicotinate. (CH₂OHCH₂)₃NC₅H₄NCOOH
Glyceryl methylamine nicotinate.
CH₂OHCHOHCH₂NH(CH₃)C₅H₄NCOOH
Methyl glucamine nicotinate.
CH₂OH(CHOH)₄CH₂NH(CH₃)C₅H₄NCOOH
n-Butylamine nicotinate. C₄H₉NH₂C₅H₄NCOOH
Di-n-butylamine nicotinate. (C₄H₉)₂NHC₅H₄NCOOH
Allylamine nicotinate. CH₂:CHCH₂NH₂C₅H₄NCOOH
Ethylene diamine nicotinate. NH₂CH₂CH₂NH₂(C₅H₄NCOOH)₂

In addition to the above salts which represent the preferred type of nicotinate salts other salts such as nonyl, decyl, dodecyl, etc. amine nicotinates as well as the polyhydroxy aliphatic amine salts such as hexa-hydroxy octanol amine nicotinate may be prepared by the several methods set forth in the above examples.

Of the compounds of my invention, all of which form stable solutions adaptable for hypodermical administration, the hydroxy aliphatic amine salts of nicotinic acid in which the aliphatic amine contains from 1 to 5 (or less than 6) hydroxy groups, are ordinarily preferred. In addition, the aliphatic amine salts of nicotinic acid in which the aliphatic amine contains from 1 to 8 (or less than 9) carbon atoms are likewise preferred over the amine salts in which the amine group contains 9 or more carbon atoms.

It will be understood that my invention includes all straight chain aliphatic amine salts of nicotinic acid such for example as the primary, secondary and tertiary amine salts, the various mono-di-etc. amine salt combinations as well as the mixed amine salts. It will also be understood that the aliphatic hydrocarbon group or groups in the aliphatic amine may be saturated alkyl groups such as methyl, ethyl, propyl, butyl, amyl, etc. or unsaturated groups such as allyl, butenyl, etc.

All modifications coming within the spirit and scope of my invention are intended to be covered by the claims appended hereto.

I claim:

1. A therapeutic composition adaptable for hypodermical administration consisting essentially of an aqueous solution of a straight chain aliphatic amine salt of nicotinic acid, said solution being chemically practically neutral, physiologically stable and compatible with the tissues, and being further characterized by quick and complete absorption of the desired therapeutic properties upon injection.

2. A therapeutic composition for parenteral injection consisting essentially of an aqueous solution of a straight chain aliphatic amine salt of nicotinic acid in which the amine group of the salt contains from 1 to 8 carbon atoms, said solution being chemically practically neutral, physiologically stable and compatible with the tissues, and being further characterized by quick and complete absorption of the desired therapeutic properties upon injection.

3. A therapeutic composition for parenteral injection consisting essentially of an aqueous solution of a straight chain alkanol amine salt of nicotinic acid, said solution being chemically practically neutral, physiologically stable and compatible with the tissues, and being further characterized by quick and complete absorption of the desired therapeutic properties upon injection.

4. A therapeutic composition for parenteral injection consisting essentially of an aqueous solution of a straight chain alkanol amine salt of nicotinic acid in which the alkanol amine group of the salt contains from 1 to 5 hydroxyl groups, said solution being chemically practically neutral, physiologically stable and compatible with the tissues, and being further characterized by quick and complete absorption of the desired therapeutic properties upon injection.

5. A therapeutic composition for parenteral injection consisting essentially of an aqueous solution of monoethanolamine nicotinate, said solution being chemically practically neutral, physiologically stable and compatible with the tissues, and being further characterized by quick and complete absorption of the desired therapeutic properties upon injection.

6. A therapeutic composition for parenteral injection consisting essentially of an aqueous solution of ethylene diamine nicotinate, said solution being chemically practically neutral, physiologically stable and compatible with the tissues, and being further characterized by quick and complete absorption of the desired therapeutic properties upon injection.

7. A therapeutic composition for parenteral injection consisting essentially of an aqueous solution of isobutanolamine nicotinate, said solution being chemically practically neutral, physiologically stable and compatible with the tissues, and being further characterized by quick and complete absorption of the desired therapeutic properties upon injection.

EDMOND E. MOORE.